United States Patent [19]

Düllings et al.

[11] Patent Number: 5,052,916
[45] Date of Patent: Oct. 1, 1991

[54] MOLD FOR THE PRODUCTION OF FLAT MOLDINGS OF CURABLE CASTING RESINS

[75] Inventors: Josef Düllings, Issum; Paul Vente, Leverkusen; Werner Klöker, Krefeld, all of Fed. Rep. of Germany

[73] Assignee: Bayer Aktiengesellschaft, Fed. Rep. of Germany

[21] Appl. No.: 492,744

[22] Filed: Mar. 13, 1990

[30] Foreign Application Priority Data

Mar. 17, 1989 [DE] Fed. Rep. of Germany ....... 3908819

[51] Int. Cl.⁵ .............................................. B29C 45/23
[52] U.S. Cl. ................................ 425/564; 264/328.11; 425/568; 425/570; 425/808; 425/812
[58] Field of Search ............... 425/555, 562, 564, 565, 425/566, 568, 570, 810, 812, 808, 543; 264/328.11

[56] References Cited

U.S. PATENT DOCUMENTS 3,026,573  3/1962  Ciaio .............................. 264/328.11
4,755,131  7/1988  Schmidt .............................. 425/564

FOREIGN PATENT DOCUMENTS 3016061  10/1981  Fed. Rep. of Germany .

Primary Examiner—Timothy Heitbrink
Attorney, Agent, or Firm—Connolly & Hutz

[57] ABSTRACT

To extend the useful life of the elastic seal (6) which is arranged between a base plate (1) and a cover plate (2) of molds for the production of flat moldings of curable casting resins and through the passages (8) of which the mold cavity is charged with the casting resin melt and vented and to accelerate venting and filling, the passages (8) are in the form of fixed capillary tubes (9) which project partly into the seal (6) and which are each adjoined by a channel (10) opening into the mold cavity (3) and closure needles (13) insertable into the channels are provided.

1 Claim, 1 Drawing Sheet

MOLD FOR THE PRODUCTION OF FLAT MOLDINGS OF CURABLE CASTING RESINS

This invention relates to a mold for the production of flat moldings of curable casting resins, consisting of a base plate and a cover plate displaceable relative to one another, a compressible seal let partly into a groove to define the mold cavity being arranged between the base plate and cover plate and comprising passages for the introduction and removal of materials into and from the mold cavity.

A mold of the type in question is known from DE-C2 30 16 061. In this case, the passages consist of cannulas of injection syringes, the cannulas being withdrawn again after filling of the mold cavity. Through the elasticity of the seal, the holes close up automatically. The seal wears quickly and, because the flow cross-sections of the cannulas have to be kept as small as possible, filling and venting take a correspondingly long time.

The problem addressed by the present invention is to improve the mold described at the beginning to the extent that the seal is protected and the mold cavity can be filled and vented more quickly.

According to the invention, this problem is solved in that the passages each consist of a fixedly arranged capillary tube, which projects partly into the seal, and of an adjoining channel which opens into the mold cavity and in that insertable closure needles are associated with the channels.

It is only this construction of the mold which provides for an economic production cycle. It is obvious that, despite the capillary tubes incorporated therein, the seal has to be so compliant that the contraction in volume which the molding being produced undergoes during curing can be compensated by the axial contraction, the cover plate generally moving down accordingly so that it always remains in contact with the melt. The capillary tubes are larger in diameter than the known cannulas so that filling and venting take place more quickly. By virtue of their fixed arrangement, they have a much longer useful life. Since the channels in the seal, through insertion of a closure needle, are not only sealed off from the melt in the mold cavity, but are also freed from the melt, i.e. cleaned, at the same time, the seal is protected and has a much longer useful life. The closure needles preferably fill the channel completely, i.e. in the closed position they extend as far as the surface of the seal defining the mold cavity. The mold is particularly suitable for the production of sheets as a substrate for optical data storage media. If it is desired to produce optical disks with "pre-information", for example formatting or pregrooves, a cavity plate of metal or a polymer is arranged on the cover plate and/or base plate.

The thickness of the flat molding to be produced is preferably predetermined by exactly reproducible dosing of the casting resin melt. This is possible by virtue of the fixedly arranged capillary tube.

BRIEF DESCRIPTION OF THE DRAWING

One example of embodiment of the new mold is shown purely diagrammatically in section in the accompanying drawing (FIG. 1) and described in detail hereinafter.

DETAILED DESCRIPTION OF THE INVENTION

Figure 1:
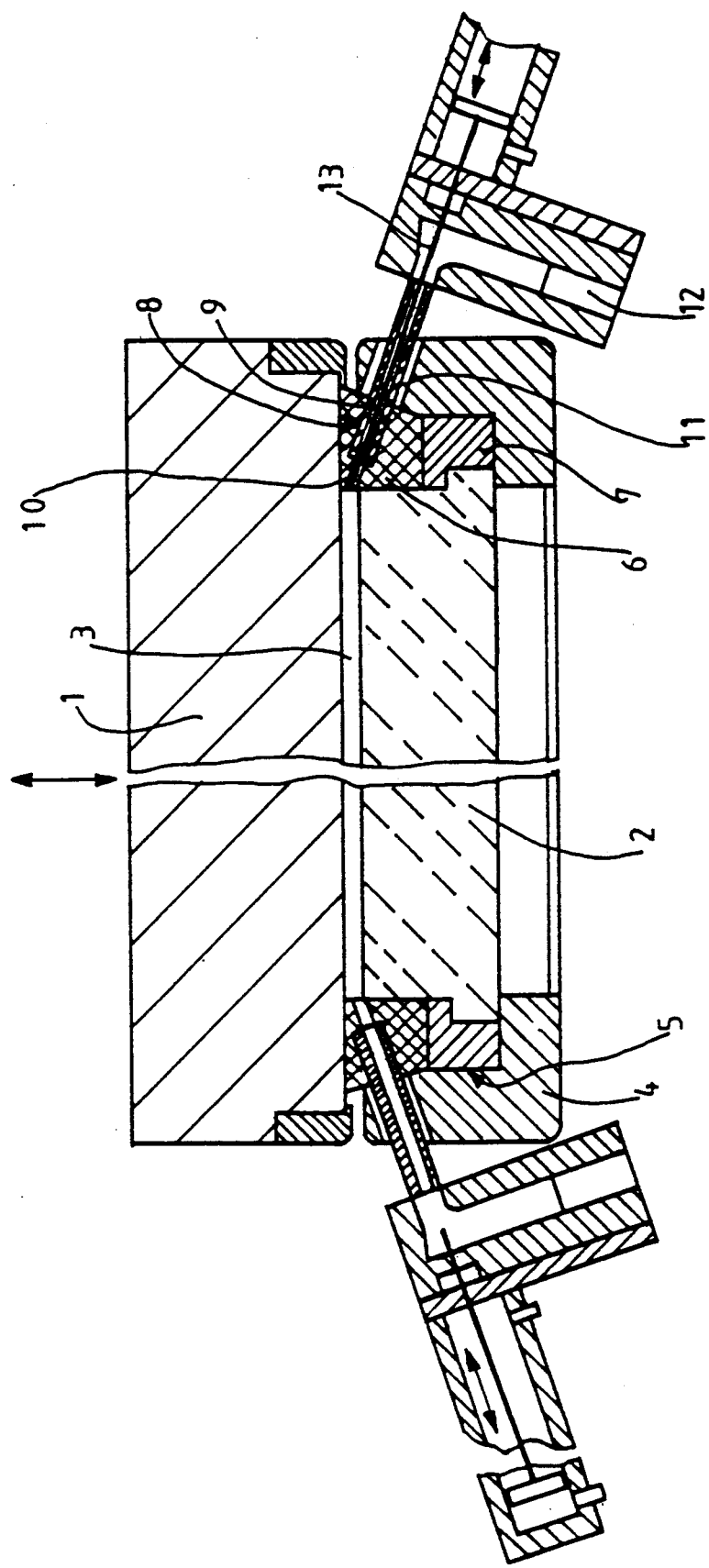

The mold consists of a metal base plate 1 and a cover plate 2 of radiation-permeable material or of metal (where non-radiation-curable two-component casting resin systems are to be used) which is designed for displacement perpendicularly of the base plate 1. Enclosed between the two plates is a mold cavity 3. The cover plate 2 is mounted in an annular frame 4, a seal 6 of a fluorine-containing elastic polymer being arranged in the groove 5 thus formed in the radial direction between the cover plate 2 and the frame 4. Beneath the seal 6, a steel ring 7 is arranged in the groove 5. Passages 8 through which the mold cavity 3 can be vented and charged with material are arranged in the seal 6. These passages 8 consist of a capillary tube 9, which projects partly into the seal 6, and of an adjoining channel 10 which opens into the mold cavity 3. The capillary tubes 9 lead outwards through bores 11 in the frame 4, the bores 11 being so large that the capillary tubes 9 do not knock against one another if they move in the event of deformation of the seal 6. The capillary tubes 9 terminate in feed passages 12 for the casting resins. Preliminary venting is possible through these feed passages 12 or, alternatively, some of the passages 8 may be used for venting and others for introducing the casting resins. Hydraulically displaceable closure needles 13 are mounted axially of the passages 8 and may be displaced as far as the channels 10 (left open, right closed position).

The mode of operation is as follows:

In the closed position of the mold and with the closure needles 13 withdrawn (left-hand illustration), the mold cavity 3 is charged with curable casting resin through the passages 8 and, at the same time, is vented. After the necessary quantity of melt has been introduced, the closure needles 13 are introduced into the passages 8 (right-hand illustration) and curing of the melt is initiated and/or supported by visible or preferably UV light or other forms of energy.

Radiation energy sources are arranged beneath the displaceable cover plate 2; other conventional energy sources are active above the base plate 1. In one preferred embodiment, several types of energy are applied at the same time. During curing, the cover plate 2 moves down at exactly the same rate at which the melt contracts in that direction so that the cover plate 2 is always in contact with the melt. The thickness of the flat molding to be produced is achieved by exactly reproducible dosing. There is thus no need for a thickness-determining stop. The flat molding can be demolded after curing.

We claim:

1. A mold for producing flat moldings of curable casting resins, said mold comprising a base plate and a cover plate displaceable relative to one another, a flat circumferential compressible seal between the base and cover plates defining a mold cavity with the base and cover plates, a plurality of passages opening into the mold cavity, a portion of said passages for venting the mold cavity and the remainder of said passages for introducing casting resins into the mold cavity, each passage including a fixedly arranged capillary tube partially projecting into the seal and a channel adjoining the capillary tube and opening into the mold cavity, and a closure needle movable within each passage for closing the channel.

* * * * *